(12) United States Patent
Kim et al.

(10) Patent No.: US 11,509,877 B2
(45) Date of Patent: Nov. 22, 2022

(54) IMAGE DISPLAY DEVICE INCLUDING MOVEABLE DISPLAY ELEMENT AND IMAGE DISPLAY METHOD

(71) Applicant: SAMSUNG ELECTRONICS CO., LTD., Suwon-si (KR)

(72) Inventors: Yuntae Kim, Suwon-si (KR); Bongsu Shin, Seoul (KR); Geeyoung Sung, Daegu (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/905,141

(22) Filed: Jun. 18, 2020

(65) Prior Publication Data
US 2021/0218946 A1 Jul. 15, 2021

(30) Foreign Application Priority Data
Jan. 14, 2020 (KR) .......................... 10-2020-0004945

(51) Int. Cl.
*H04N 13/128* (2018.01)
*H04N 13/111* (2018.01)
*H04N 13/00* (2018.01)

(52) U.S. Cl.
CPC ......... *H04N 13/128* (2018.05); *H04N 13/111* (2018.05); *H04N 2013/0081* (2013.01); *H04N 2213/002* (2013.01)

(58) Field of Classification Search
None
See application file for complete search history.

(56) References Cited

U.S. PATENT DOCUMENTS

| 2005/0122549 A1 | 6/2005 | Goulanian et al. |
| 2007/0280668 A1 | 12/2007 | Kubo et al. |
| 2011/0075257 A1* | 3/2011 | Hua ..................... G02B 26/004 359/464 |

(Continued)

FOREIGN PATENT DOCUMENTS

| CN | 109031484 A | 12/2018 |
| EP | 3211471 A1 | 8/2017 |

(Continued)

OTHER PUBLICATIONS

Communication dated Apr. 9, 2021 issued by the European Patent Office in European Application No. 20201863.6.

*Primary Examiner* — Jason A Pringle-Parker
(74) *Attorney, Agent, or Firm* — Sughrue Mion, PLLC

(57) ABSTRACT

An image display device includes a processor that sets a location of a virtual image plane on which a virtual image is formed according to depth information included in first image data and generates second image data obtained by correcting the first image data based on the set location of the virtual image plane; an image forming optical system including a display element configured to modulate light to form a display image according to the second image data and a light transfer unit that forms the virtual image on the virtual image plane, the virtual image corresponding to the display image formed by the display element, the light transfer unit comprising a focusing member; and a drive unit that drives the image forming optical system to adjust the location of the virtual image plane.

21 Claims, 19 Drawing Sheets

(56) References Cited

U.S. PATENT DOCUMENTS

| | | | |
|---|---|---|---|
| 2014/0206443 A1* | 7/2014 | Sharp | G06T 7/50 |
| | | | 463/31 |
| 2016/0110920 A1 | 4/2016 | Schowengerdt | |
| 2016/0320620 A1 | 11/2016 | Maimone | |
| 2017/0237974 A1* | 8/2017 | Samec | G06T 19/006 |
| | | | 348/53 |
| 2017/0262054 A1* | 9/2017 | Lanman | G02B 27/0172 |
| 2017/0315367 A1 | 11/2017 | Maruyama et al. | |
| 2017/0374341 A1* | 12/2017 | Michail | G06T 19/006 |
| 2018/0081429 A1* | 3/2018 | Akenine-Moller | G06T 3/0093 |
| 2018/0239136 A1* | 8/2018 | Ishikawa | G06F 3/013 |
| 2020/0035027 A1* | 1/2020 | Sung | G02B 30/25 |

FOREIGN PATENT DOCUMENTS

| | | |
|---|---|---|
| KR | 101971937 B1 | 4/2019 |
| WO | 2018027015 A1 | 2/2018 |

\* cited by examiner

IMAGE DISPLAY DEVICE INCLUDING MOVEABLE DISPLAY ELEMENT AND IMAGE DISPLAY METHOD

CROSS-REFERENCE TO RELATED APPLICATION

This application claims priority to Korean Patent Application No. 10-2020-0004945, filed on Jan. 14, 2020, in the Korean Intellectual Property Office, the disclosure of which is incorporated by reference herein in its entirety.

BACKGROUND

1. Field

Example embodiments of the present disclosure relate to a three-dimensional image display device and method.

2. Description of Related Art

Three-dimensional image display technology is applied to various fields. For example, this technology has been applied in recent years to image devices for virtual reality (VR) and augmented reality (AR).

Head-mounted displays that provide virtual reality (VR) are currently commercialized and are widely employed in the entertainment industry. In addition, head-mounted displays have been developed to have structures that may be employed in medical, educational, and industrial fields.

An augmented reality (AR) display, which is an advanced form of a virtual reality display, is an image device that combines the real world with virtual reality and is capable of allowing an interaction between a real situation and virtual reality. An interaction between a real situation and virtual reality is based on a function for providing information about a real situation in real time, and an effect of the real situation may be further increased by overlaying a virtual object or information on a real-world environment.

Such a device commonly uses stereoscopy technology to display a three-dimensional image. Thus, at this time, a three-dimensional image display method for multi-depth displaying is required to avoid visual fatigue that may be caused by vergence-accommodation conflict.

SUMMARY

Example embodiments provide a three-dimensional (3D) image display device and method that allow multi-depth displaying.

Additional aspects will be set forth in part in the description which follows and, in part, will be apparent from the description, or may be learned by practice of embodiments of the disclosure.

In accordance with an aspect of the disclosure, an image display device includes a processor that sets a location of a virtual image plane on which a virtual image is formed according to depth information included in first image data and generates second image data obtained by correcting the first image data based on the set location of the virtual image plane; an image forming optical system including a display element configured to modulate light to form a display image according to the second image data; and a light transfer unit that forms the virtual image on the virtual image plane, the virtual image corresponding to the display image formed by the display element, the light transfer unit including a focusing member; and a drive unit that drives the image forming optical system to adjust the location of the virtual image plane.

The first image data may include a plurality of frames, and the processor may set the respective location of the virtual image plane and generate the respective second image data for each frame from among the plurality of frames.

The respective virtual images corresponding to each frame from among the plurality of frames may have a same respective apparent size.

The processor may generate a drive signal to control the image forming optical system according to the set location of the virtual image plane and may transmit the drive signal to the drive unit.

The drive unit may move the display element in a direction parallel to an optical axis of the display element according to the drive signal so that a distance between the display element and the focusing member is changed.

The drive unit may include a shape variable portion that is deformed according to the drive signal and may provide a drive power to the display element.

For a frame from among the plurality of frames, the processor may generate the second image data by comparing the set location of the virtual image plane with a previous location of the virtual image plane of a previous frame and using a correction parameter that offsets a change in magnification according to a change in the location of the virtual image plane.

The processor may generate the second image data by using a first function applied to the first image data when the location of the virtual image plane approaches an observer or a second function applied to the first image data when the location of the virtual image plane moves away from the observer.

The first function and the second function may be preset based on a time-stroke curve extracted from drive characteristics of the drive unit.

The processor may generate the second image data by obtaining an image of the first image data captured by a virtual camera positioned at a first position; and for a frame from among the plurality of frames, moving the virtual camera by a distance $-\Delta z$ to a second position, where $\Delta z$ represents a change value obtained by comparing the set location of the virtual image plane with a previous location of the virtual image plane of a previous frame.

The processor may generate the second image data by obtaining an image of the first image data captured by a virtual camera having a first field of view; and for a frame from among the plurality of frames, changing the first field of view of the virtual camera by $-\Delta\theta$ to a second field of view, where $\Delta\theta$ represents a change value obtained by comparing a field of view corresponding to the set location of the virtual image plane with a previous field of view corresponding to the virtual image plane of a previous frame.

The processor may set the location of the virtual image plane by analyzing a depth map and a color map included in the first image data.

The processor may set the location of the virtual image plane by using a histogram of depth values included in the depth map.

The processor may set the location of the virtual image plane by analyzing saliency information based on the color map.

The image display device may further include an eye tracking sensor that senses a depth location viewed by an observer, wherein the processor sets the location of the virtual image plane according to the sensed depth location.

The light transfer unit may form an image at a position of an observer by combining the display image formed by the display element and light entering the light transfer unit from a front side of the observer and may transmit the image to a visual field of the observer.

The display element may include a left eye display element and a right eye display element, the second image data may include second left eye image data and second right eye image data, and the left eye display element may be configured to form a left eye display image according to the second left eye image data and the right eye display element may be configured to form a right eye display image according to the second right eye image data.

The image display device may be a wearable device.

In accordance with an aspect of the disclosure, an image display method includes setting a location of a virtual image plane on which a virtual image is formed according to depth information included in first image data; generating second image data obtained by correcting the first image data based on the set location of the virtual image plane; controlling an image forming optical system including a display element so that the virtual image is formed at the set location of the virtual image plane, the virtual image corresponding to a display image formed by the display element; and transmitting a light modulation signal based on the second image data to the display element.

The first image data may include a plurality of frames, and the setting of the location of the virtual image plane and the generating of the second image data may be performed for each frame from among the plurality of frames.

The respective virtual images corresponding to each frame from among the plurality of frames may have a same respective apparent size.

For a frame from among the plurality of frames, the generating of the second image data may include comparing the set location of the virtual image plane with a previous location of the virtual image plane of a previous frame; and using a correction parameter that offsets a magnification change according to a change in the location of the virtual image plane.

The using of the correction parameter may include extracting the correction parameter from a time-stroke curve preset based on drive characteristics of a drive unit for driving the display element.

The generating of the second image data may include obtaining an image of the first image data captured by a virtual camera positioned at a first position; and for a frame from among the plurality of frames, moving the virtual camera by a distance −Δz to a second position, where Δz represents a change value obtained by comparing the set location of the virtual image plane with a previous location of the virtual image plane of a previous frame.

The generating of the second image data may include obtaining an image of the first image data captured by a virtual camera having a first field of view; and for a frame from among the plurality of frames, changing the first field of view of the virtual camera by −Δθ to a second field of view, where Δθ represents a change value obtained by comparing a field of view corresponding to the set location of the virtual image plane with a previous field of view corresponding to the virtual image plane of a previous frame.

In accordance with an aspect of the disclosure, an image display device includes a processor configured to receive image data including first frame data corresponding to a first frame and second frame data corresponding to a second frame, the first frame preceding the second frame; determine a difference between a first depth value included in the first frame data and a second depth value included in the second frame data; and generate corrected second frame data based on the determined difference; a display element configured to display an image corresponding to the corrected second frame data; and a drive unit configured to adjust a position of the display element based on the determined difference.

The image display device may further include a light transfer unit configured to transfer a first image corresponding to the first frame data and a second image corresponding to the second frame data to a position of an observer, wherein the processor is further configured to determine the first depth value as corresponding to a depth of a first virtual image perceived by the observer when the first image is transferred, and determine the second depth value as corresponding to a depth of a second virtual image perceived by the observer when the second image is transferred.

The processor may be further configured to determine a ratio for resizing the second frame data based on the determined difference and generate the corrected second frame data based on the determined ratio.

The processor may be further configured to adjust a position of a virtual camera viewing the second frame data based on the determined difference, and generate the corrected second frame data based on the adjusted position of the virtual camera.

The processor may be further configured to adjust a field of view of a virtual camera viewing the second frame data based on the determined difference, and generate the corrected second frame data based on the adjusted field of view of the virtual camera.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
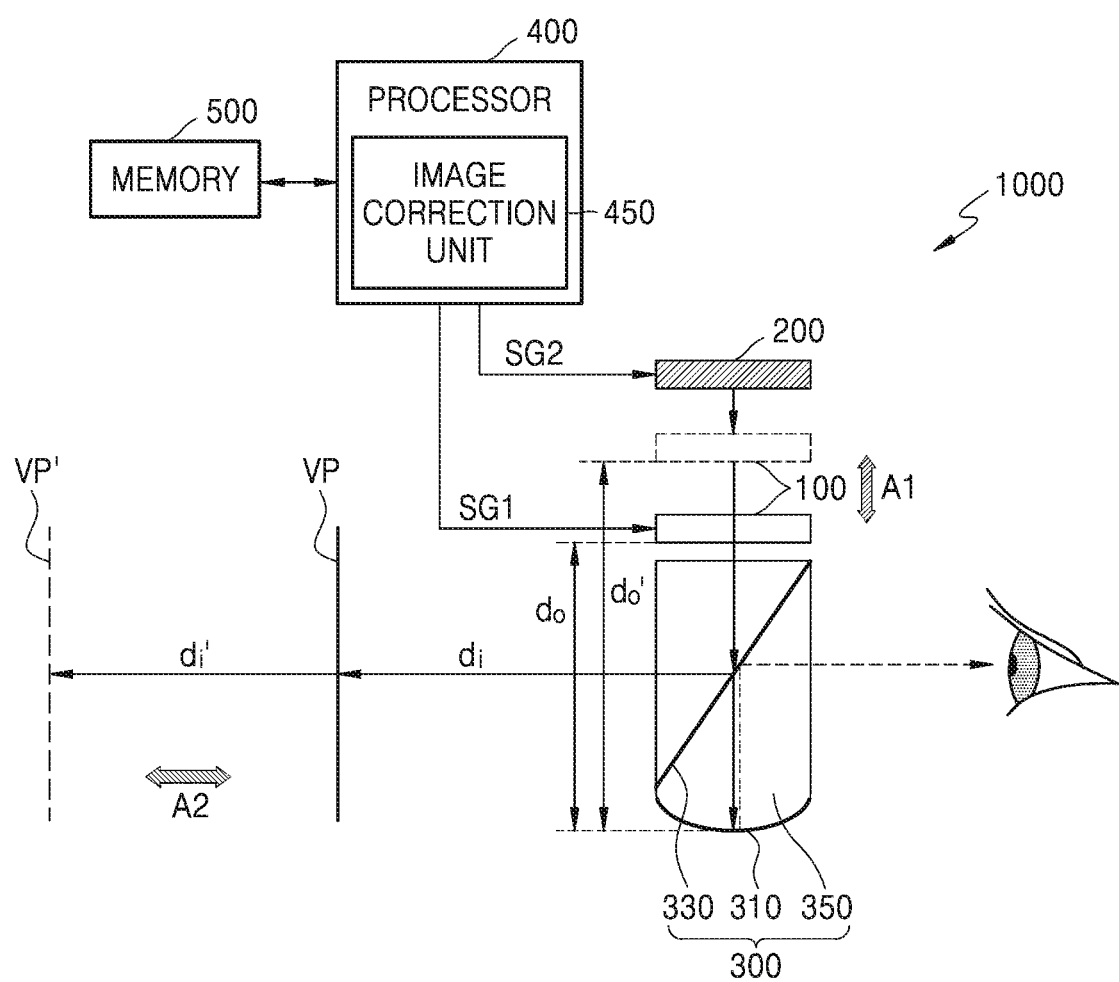
FIG. 1 is a diagram illustrating a configuration and an optical arrangement of an image display device according to an example embodiment.

Example embodiments will now be described in detail with reference to the accompanying drawings, wherein like reference numerals refer to like elements throughout. In this regard, embodiments may have different forms and should not be construed as being limited to the descriptions set forth herein.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. In the drawings, like reference numerals refer to like elements, and a size of each element in the drawings may be exaggerated for clarity and convenience of description. The embodiments to be described below are mere examples, and various modifications are possible from the embodiments.

Hereinafter, what is described as "over" or "on" may include not only directly over and in contact but also over without being in contact.

A singular expression includes plural expressions unless the context clearly indicates otherwise. In addition, when a part is described to "include" a certain configuration element, this means that the part may further include other configuration elements unless otherwise stated.

A term "above-described" and similar terminology may be used for the singular and the plural.

Unless a sequence of steps configuring a method is stated explicitly, the steps may be performed in any appropriate sequence. The disclosure is not limited to a sequence of description of the steps. Use of all examples or example terms (for example, and so on) is merely for describing the technical idea in detail, and the scope is not limited by the examples or the example terms.

Figure 2:
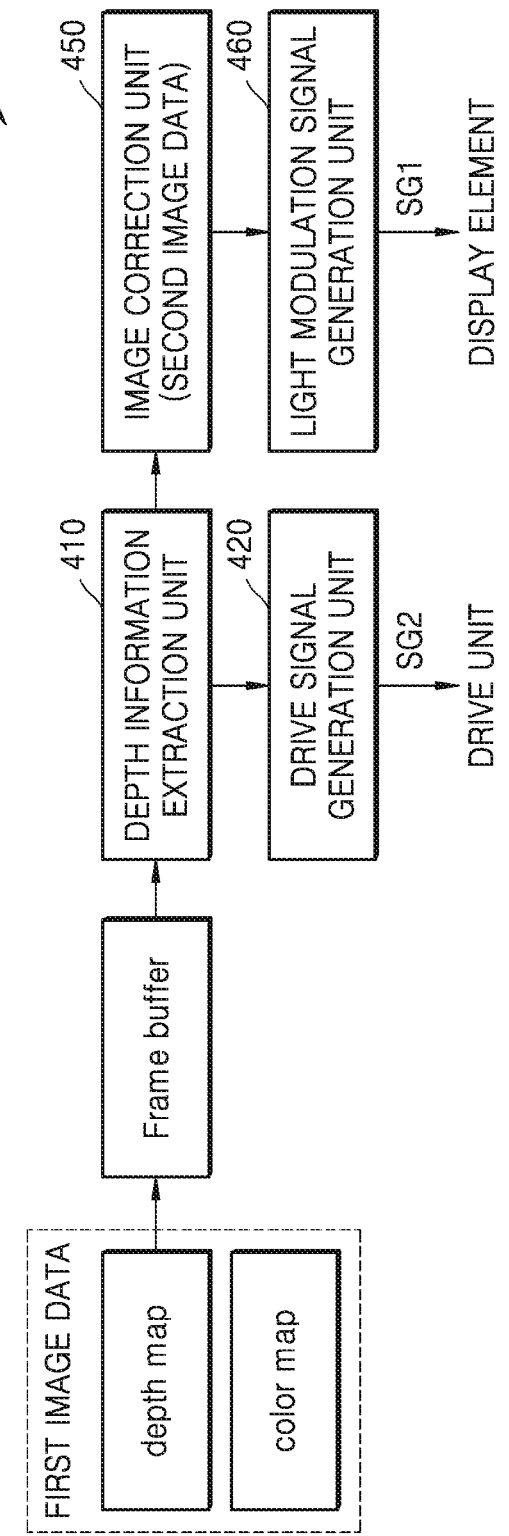
FIG. 2 is a block diagram schematically illustrating a configuration of a processor included in the image display device of FIG. 1.

FIG. 1 is a diagram illustrating a configuration and an optical arrangement of an image display device according to an example embodiment. FIG. 2 is a block diagram schematically illustrating a configuration of a processor included in the image display device of FIG. 1.

Referring to FIG. 1, an image display device 1000 includes an image forming optical system including a display element 100 that modulates light to form an image (i.e., a display image) and a light transfer unit 300 that transmits the image formed by the display element 100 to an eye of an observer, a drive unit 200 that drives the image forming optical system to adjust a location of a virtual image plane formed by the image forming optical system, and a processor 400 that controls the display element 100 and the drive unit 200 according to image information. The processor 400 includes an image correction unit 450 which corrects an image in consideration of the location of a variable virtual image plane.

The image display device 1000 also includes a memory 500 that may store image information, various data and codes of programs necessary for driving the image display device 1000.

The image display device 1000 may also further include an eye tracking sensor that senses a depth location observed by an observer.

The display element 100 modulates light according to image information to form an image to be provided to an observer. The image formed by the display element 100 may be provided to both eyes of the observer, and the drawing illustrates only an optical system facing a single eye for the sake of convenience. The image formed by the display element 100 may be, for example, a stereo image provided to the left and right eyes of the observer, may be a hologram image, a light field image, or an integral photography (IP) image, and may also include a multi-view image or a super multi-view image. In addition, the disclosure is not limited thereto and may include a general two-dimensional image.

The display element 100 may include, for example, a liquid crystal on silicon (LCoS) element, a liquid crystal display (LCD) element, an organic light emitting diode (OLED) display element, or a digital micromirror device (DMD), and may also include a next generation display such as a micro LED and a quantum dot (QD) LED.

The display element 100 may include a light source for providing light for forming an image, and in addition to this, the display element 100 may further include a beam splitter for adjusting an optical path, a relay lens for enlarging or reducing an image, a spatial filter for removing noise, and so on.

The light transfer unit 300 changes a path of an image formed by the display element 100, forms an image suitable for a visual field of an observer, and transmits the image to an eye of the observer. The light transfer unit 300 may include a focusing member 310 and may also include a beam splitter 330 as a member for diverting light to change a path.

The focusing member 310 is an imaging forming member having a refractive power and may enlarge or reduce an image formed by the display element 100. The focusing member 310 is illustrated as a concave mirror but is not limited thereto. The focusing member 310 may have a configuration in which a convex lens, a concave lens, and so on are combined, in addition to or instead of the concave mirror.

The beam splitter 330 may be a half mirror that transmits half of incident light and reflects the other half. The beam splitter is not limited thereto and may be a polarization beam splitter that transmits or reflects the incident light according to polarization. When the beam splitter 330 is the polarization beam splitter, additional optical elements for polarization switching may be further provided to the light transfer unit 300.

As illustrated in FIG. 1, the light transfer unit 300 may have an integral structure in which the focusing member 310 and the beam splitter 330 are fixed to a transparent light guide member 350. This is an example, and the disclosure is not limited thereto.

The light transfer unit 300 may combine light including an image formed by the display element 100 with light including an image of a real environment in front of an observer and transmit the combined light to a visual field of the observer. Accordingly, the image display device 1000 may function as a see-through type display that displays both an image formed by the display element 100 and a real environment in front of an observer.

The light transfer unit 300 is not limited to the illustrated shape and configuration. An additional optical element for transmitting an image formed by the display element 100 to a pupil of an observer together with a real environment image in front of the observer may be further provided, and optical windows having various shapes and structures may be employed.

Light including the image formed by the display element 100 passes through the beam splitter 330, is reflected by the focusing member 310, and then reaches an eye of the observer through a path reflected by the beam splitter 330 again. In this path, the observer perceives a virtual image formed on a virtual image plane VP at a certain location behind the beam splitter 330, and there is a difference in depth sense that the observer feels, according to a location of the virtual image plane VP.

In the image display device 1000 according to an example embodiment, the location of the virtual image plane VP is not fixed as one location, and the location of the virtual image plane VP may be changed by considering depth information of an image to be displayed. For this, the image display device 1000 includes the drive unit 200 that drives an image forming optical system. As illustrated in FIG. 1, the drive unit 200 may be configured to change a location of the display element 100. The drive unit 200 may move the display element 100 in a direction parallel to an optical axis of the display element 100 so that a distance to the focusing member 310 is variable. When the location of the display element 100 is changed in a direction A1, the location of the virtual image plane VP changes in a direction A2. This is an example, and in an example embodiment, the drive unit 200 may drive the focusing member 310 to change the location of the virtual image plane VP.

The drive unit 200 employed in the image display device 1000 may include various types of actuators. The drive unit 200 may adopt a shape-variable material in order to increase a drive range of the display element 100 with as small volume as possible. A type of the drive unit 200 is not limited in particular.

The processor 400 may generate a light modulation signal SG1 to be transmitted to the display element 100 and a drive signal SG2 to be transmitted to the driver 200, according to depth information related to an image to be perceived by an observer.

As illustrated in FIG. 2, the processor 400 may set a location of a virtual image plane on which an image is formed according to depth information included in first image data and may generate second image data obtained by correcting the first image data based on the location of the virtual image plane.

The first image data may include a depth map and a color map. That is, the first image data may include color value data for each pixel of a plurality of pixels for each image of a plurality of frames to be provided to an observer and may also include depth information linked to the location of the virtual image plane VP where each image is imaged. The first image data may be stored in a frame buffer.

A depth information extraction unit 410 analyzes the first image data to extract depth information and sets a depth location in which an image is displayed, that is, the location of the virtual image plane. The location setting may be performed for each of images of the plurality of frames. In order to extract depth information, a depth map and a color map included in the first image data may be analyzed. For example, the location of the virtual image plane may be set by using a histogram of a frequency of depth values included in the depth map. Alternatively, the location of the virtual image plane may be set by analyzing saliency information from the color map. The saliency map analysis may be performed to select a region that the observer is likely to observe, that is, a region having high visual concentration. Brightness, a color, an outline, an object size, and so on may be considered for selecting the region having high visual concentration. For example, a region having great brightness or a great color difference compared to an ambient region, a region having strong outline characteristics, or a region having a large object size may be the region having high visual concentration. Alternatively, a location having high visual concentration may be selected depending on content included in an image. The location of the virtual image plane may be set in consideration of visual concentration. In addition to this, in order to set the location of the virtual image plane, analysis of motion information or zone of comfort (ZOC) analysis in which human visual perception characteristics are considered may be performed.

When the image display device 1000 includes the eye tracking sensor that senses a depth location observed by an observer, the depth information extraction unit 410 may also set the location of the virtual image plane based on the depth location sensed by the eye tracking sensor.

The drive signal generation unit 420 may generate the drive signal SG2 that causes the display element 100 to be moved so that an image is formed at the set location of the virtual image plane. The drive signal SG2 may be, for example, an electrical signal that generates heat suitable for deformation of a variable material of the drive unit 200. The drive signal is not limited thereto. The drive signal SG2 generated by the drive signal generation unit 420 is transmitted to the drive unit 200.

The image correction unit 450 generates second image data which is corrected first image data according to the depth information extracted by the depth information extraction unit 410. The light modulation signal generation unit 460 generates the light modulation signal SG1 according to the second image data and transmits the light modulation signal to a display element. That is, the light modulation signal generation unit 460 may generate an electrical signal having a color value determined by referring to data for each pixel included in the second image data as the light modulation signal SG1.

Image correction performed by the image correction unit 450 is for correcting image distortion occurring when the location of the virtual image plane changes according to location movement of the display element 100.

The image distortion occurring when the location of the virtual image plane changes will be described with reference to FIG. 1 and FIGS. 3A to 3D as follows.

FIGS. 3A to 3D are diagrams conceptually illustrating that an eye of an observer perceives images having different depth locations as images having different sizes.

Figure 3A:
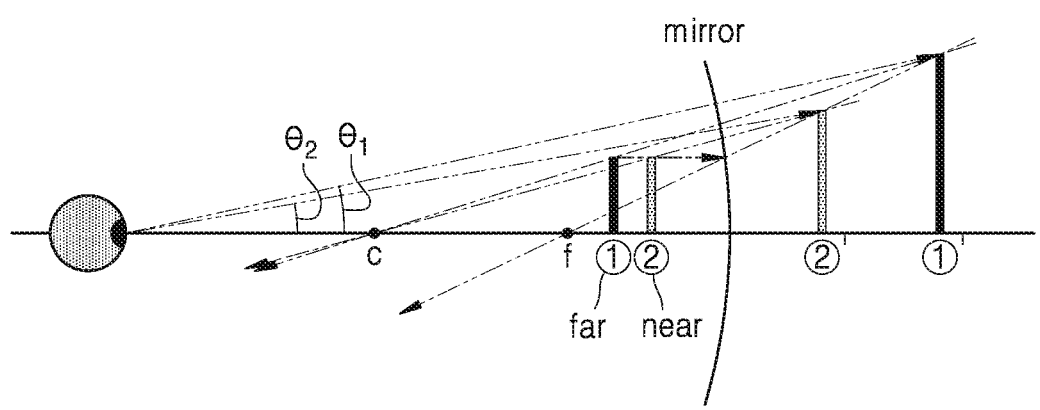
FIGS. 3A to 3D are diagrams conceptually illustrating that an eye of an observer perceives images having different depths as images having different sizes.

Referring to FIG. 3A, when a concave mirror forms images of objects ① and ② having different depth locations (far and near), the formed images ①' and ②' have different sizes respectively and are also perceived as spanning different fields of view θ1 and θ2.

Figure 3B:
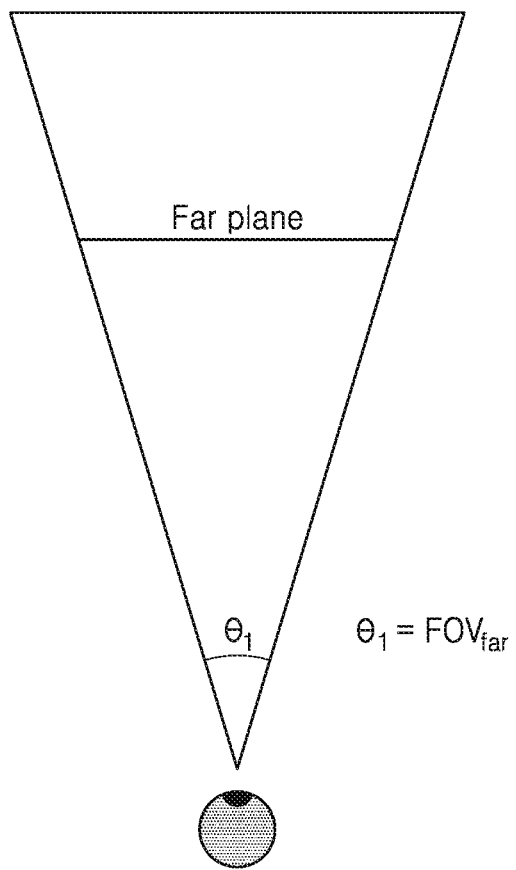
Figure 3C:
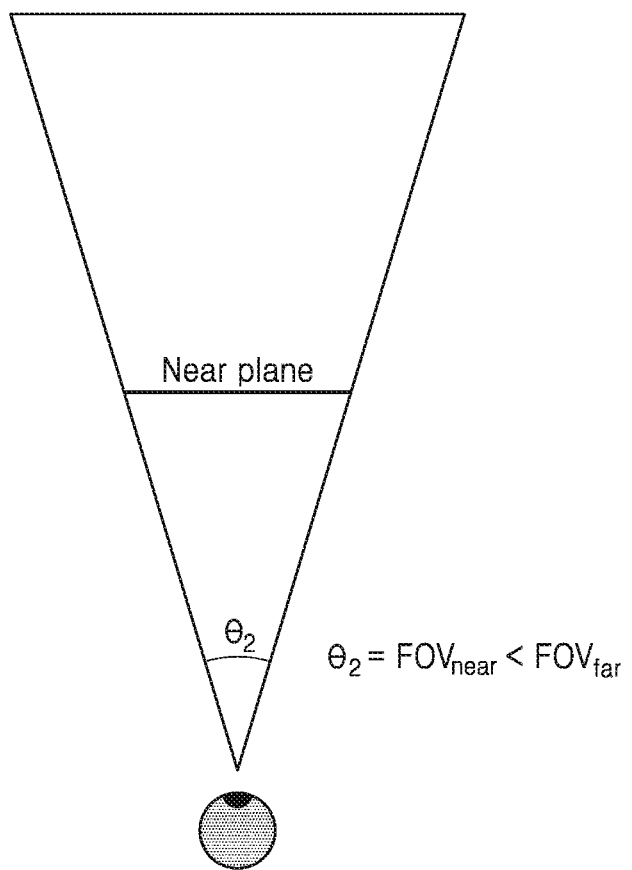
Figure 3D:
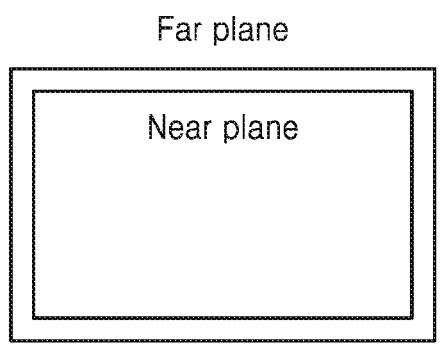

As illustrated in FIG. 3B and FIG. 3C, when the locations of the virtual planes are a far plane and a near plane, angles of view are $FOV_{far}$ and $FOV_{near}$, and have a relationship of $FOV_{far} > FOV_{near}$. In addition, as illustrated in FIG. 3D, a screen size of the near plane is perceived to be smaller than a screen size of the far plane.

This may also be explained by the concept of magnification. A magnification m is defined as image distance/object distance and is $d_i/d_o$ in FIG. 1. Here, $d_o$ is a distance from an image display surface of the display element 100 to the focusing member 310, and $d_i$ is a distance along a virtual optical path from the focusing member 310 to the virtual image plane VP, and the illustrated distances $d_i$ and $d_i'$ indicate the sum of a distance from the center of the focusing member 310 to the center of the beam splitter 330 and a distance from the center of the beam splitter 330 to the virtual image planes VP and VP', respectively.

When $d_o$ and $d_i$ are determined according to the location of the display element 100 and the location of the virtual image plane VP, and when a magnification at this time is referred to as m, the magnification m' corresponding to the location of the changed virtual image plane VP' is $d_i'/d_o'$ and this value is different from m.

The image display device 1000 according to an example embodiment generates the second image data corrected by considering the location of the virtual image plane to be formed to correct image distortion caused by a magnification change made in a continuous frame image, and provides the light modulation signal SG1 according thereto to the display element 100. The second image data is data corrected to display an image of as constant an apparent size as possible at the location of the virtual image plane that changes according from frame to frame. In addition, the second image data may be image data obtained by correcting other image distortions, for example, pincushion distortion, barrel distortion, image misalignment, and so on, which are generated according to a change in location of the virtual image plane.

Figure 4:
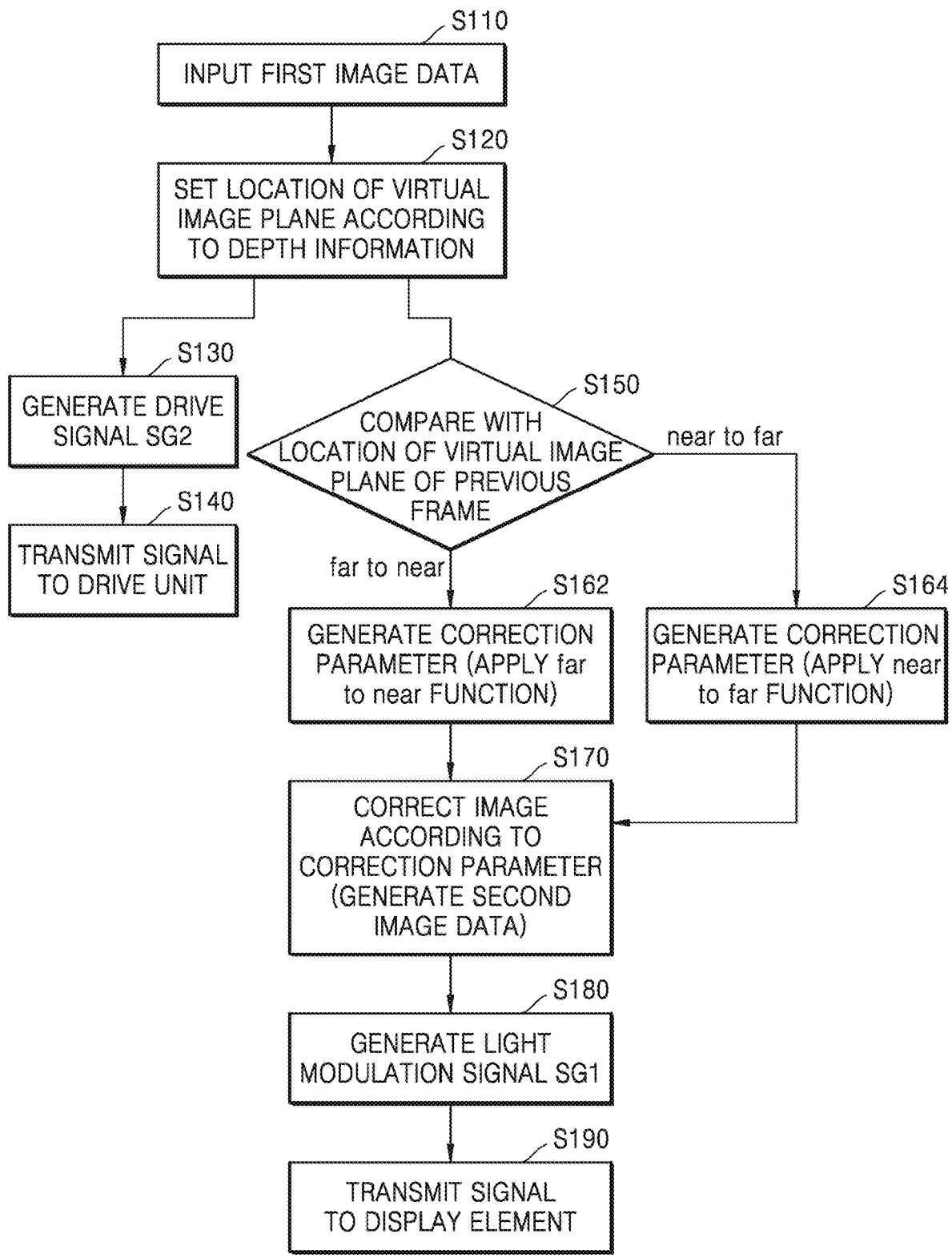
FIG. 4 is a flowchart illustrating in detail an example operation of a processor in the image display device of FIG. 1 according to an example embodiment.

FIG. 4 is a flowchart illustrating in detail an example operation of the processor 400 in the image display device 1000 of FIG. 1.

When the first image data for an image to be formed in each frame is input (S110), a location of a virtual image plane is set according to depth information included in the first image data (S120).

When the location of the virtual image plane is set, the drive signal SG2 for driving the display element to this location is generated (S130) and the drive signal is transmitted to the drive unit (S140).

The set location of the virtual image plane is compared to a location of a virtual image plane of the immediately preceding frame (S150).

Depending on whether the location of the virtual image plane changes from near to far or from far to near (i.e., whether the virtual image plane gets farther away or closer), correction parameters of different functions may be applied. When the location of the virtual image plane moves farther away, a near to far function is applied (S164), and when the location of the virtual image plane gets closer, a far to near function is applied (S162).

Figure 5A:
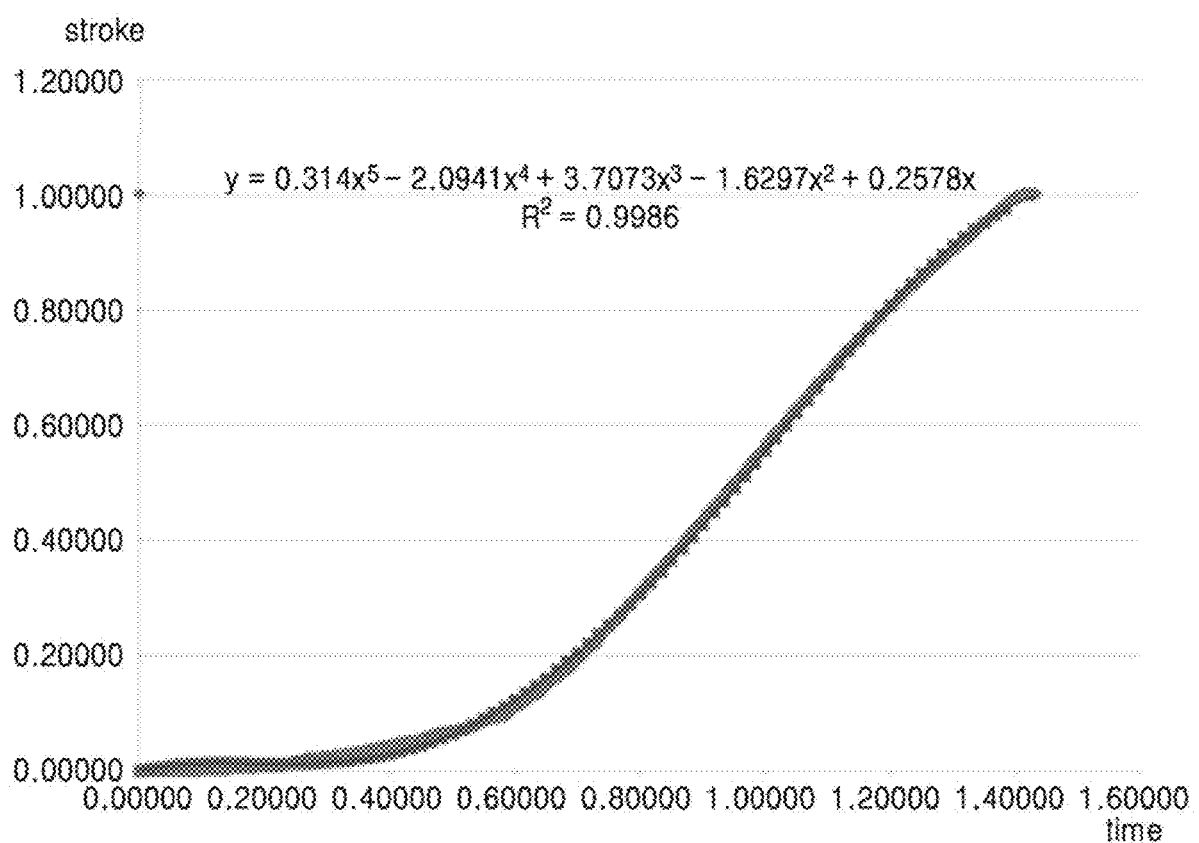
FIG. 5A illustrates an example of a function that is used for image correction and that corresponds to a near to far situation.
Figure 5B:
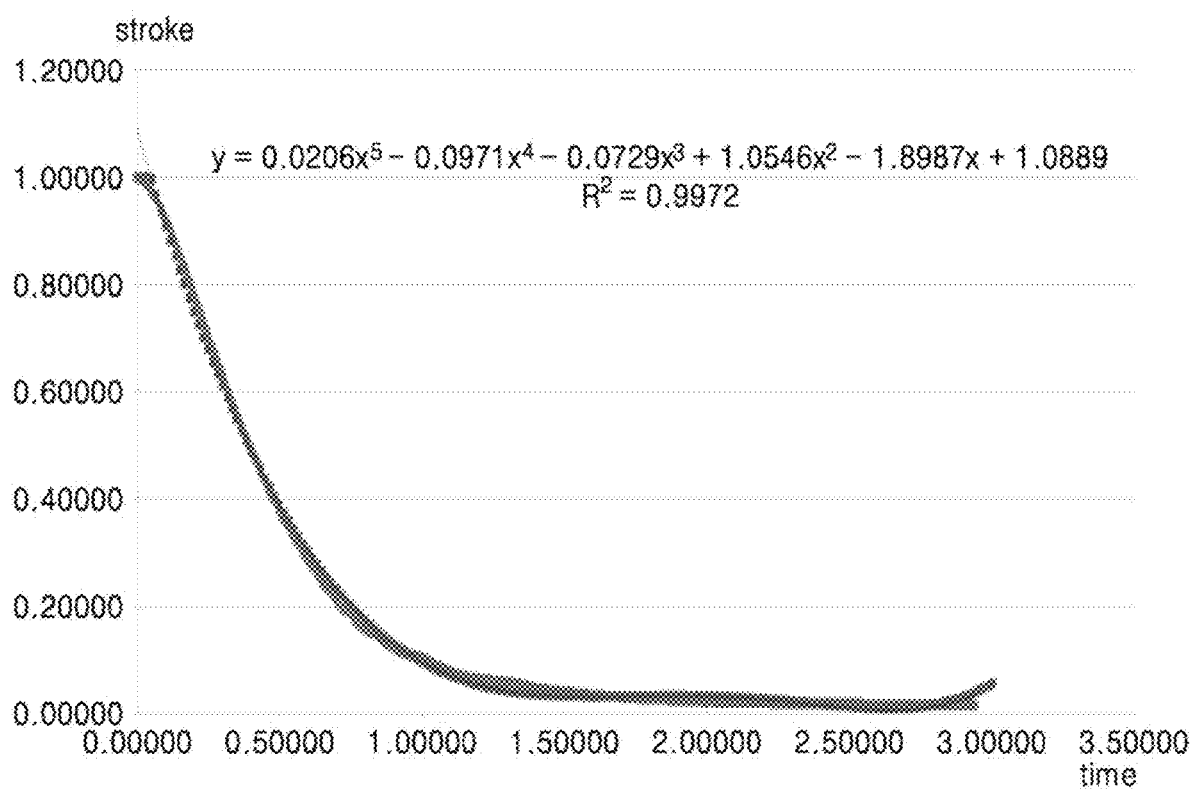
FIG. 5B illustrates an example of a function that is used for image correction and that corresponds to a far to near situation.

FIG. 5A and FIG. 5B illustrate example graphs for functions corresponding to near to far and far to near situations, respectively as functions used for image correction.

The two graphs are time-stroke curves extracted from drive characteristics of the drive unit. A function for determining a correction parameter may be preset in each case from time-stroke data for two cases of far to near and near to far situations.

FIG. 5A includes a result of measuring data in which the location of the display element changes from far to near according to an operation of the drive unit, and a function graph extracted by performing regression analysis of the measurement result with a polynomial function.

When the location of the virtual image plane changes from far to near, an image becomes small as illustrated in FIGS. 3A and 3B, and in order to offset this, a resize function for image enlargement may be set to adjust the image size.

This function (ratio) may be set as follows from a function y extracted in FIG. 5A.

$$\text{ratio} = 1 + y^*(\alpha)$$

Here, α is a value between 0 and 1. α may be, for example, 0.01, but is not limited thereto, and other suitable values may be selected.

FIG. 5B includes a result of measuring data in which the location of the display element changes from near to far according to the operation of the drive unit, and a function graph extracted by performing regression analysis of the measurement result with a polynomial function.

When the location of the virtual image plane changes from near to far, an image is enlarged as illustrated in FIGS. 3A and 3B, and in order to offset this, a resize function for image reduction may be set to adjust an image size.

This function (ratio) may be set as follows from a function y extracted in FIG. 5B.

$$\text{ratio} = 1 - (1-y)^*(\alpha)$$

Here, α is a value between 0 and 1. α may be, for example, 0.01, but is not limited thereto, and other suitable values may be selected.

Referring back to FIG. 4, the second image data is generated by correcting an image according to the set correction parameter (S170).

The optical modulation signal SG1 is generated according to the second image data (S180), and the optical modulation signal is transmitted to the display element (S190).

The image enlargement process and the image reduction process may be continuously performed according to a change in location of the display element 100 from frame to frame.

The image forming optical system displays an image according to the optical modulation signal SG1 and the drive signal SG2, and the displayed image may be perceived by an observer from the changed location of the virtual image plane VP. The observer perceives an image having little image distortion due to a change in the location of the virtual image plane.

Figure 6:
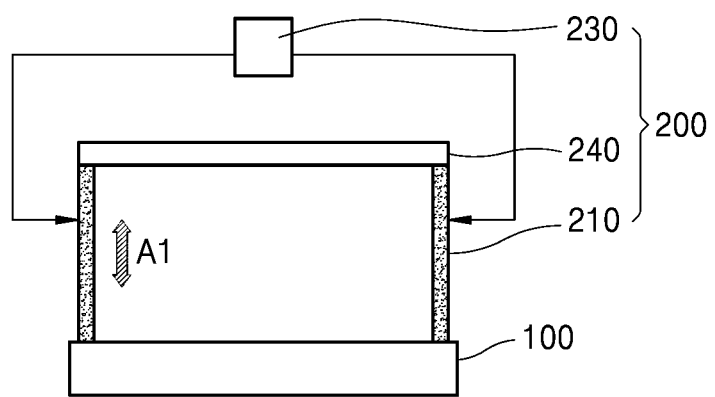
FIG. 6 illustrates an example configuration of a drive unit included in the image display device of FIG. 1.

FIG. 6 illustrates an example configuration of the drive unit included in the image display device of FIG. 1.

The drive unit 200 may include a shape variable portion 210, a support portion 240, and a drive control unit 230. A plurality of shape variable portions 210 may be provided so that both ends thereof may be in contact with the support portion 240 and the display element 100, respectively. Although a pair of shape variable portions 210 are illustrated, this is an example and the number of the shape variable portions 210 may be changed.

A length of the shape variable portion 210 may change depending on a temperature of the shape variable portion 210 or an electric field formed in the shape variable portion

210. For example, the shape variable portion 210 may include a shape memory alloy (SMA), an electro active polymer (EAP), or a combination thereof. When the shape variable portion 210 includes a shape memory alloy, the shape variable portion 210 may have a short length at a high temperature and a long length at a low temperature. When the shape variable portion 210 includes an electroactive polymer, and when the electric field is applied to the shape variable portion 210, the length of the shape variable portion 210 may be increased in a direction perpendicular to the applied electric field.

The drive control unit 230 may be electrically connected to the shape variable portion 210 to apply an electrical signal to the shape variable portions 210. For example, the drive control unit 230 may apply a current to the shape variable portions 210. When an electrical signal is applied to the shape variable portion 210 and a temperature of the shape variable portion 210 increases, the lengths of the shape variable portions 210 may be reduced. In this case, the display element 100 approaches the support portion 240, that is, a distance to the focusing member 310 is increased. When no current is applied to the shape variable portion 210, the temperature of the shape variable portion 210 is lowered, and a length thereof may be increased. In this way, the temperature of the shape variable portion 210 is controlled, and thus, a degree of change in the lengths of the shape variable portions 210 may be adjusted, and a distance between the display element 100 and the focusing member 310 may be adjusted. As the shape variable portion 210 is deformed in an A1 direction as shown in FIG. 6, a drive power in the A1 direction is provided to the display element 100, and the distance between the display element 100 and the focusing member 310 may be adjusted. Accordingly, the location of the virtual image plane VP on which an image formed by the display element 100 is formed may be changed in an A2 direction illustrated in FIG. 1.

The illustrated shape of the drive unit 200 is an example and may be changed to other shapes capable of providing a drive power to the display element 100 in the A1 direction.

Figure 7:
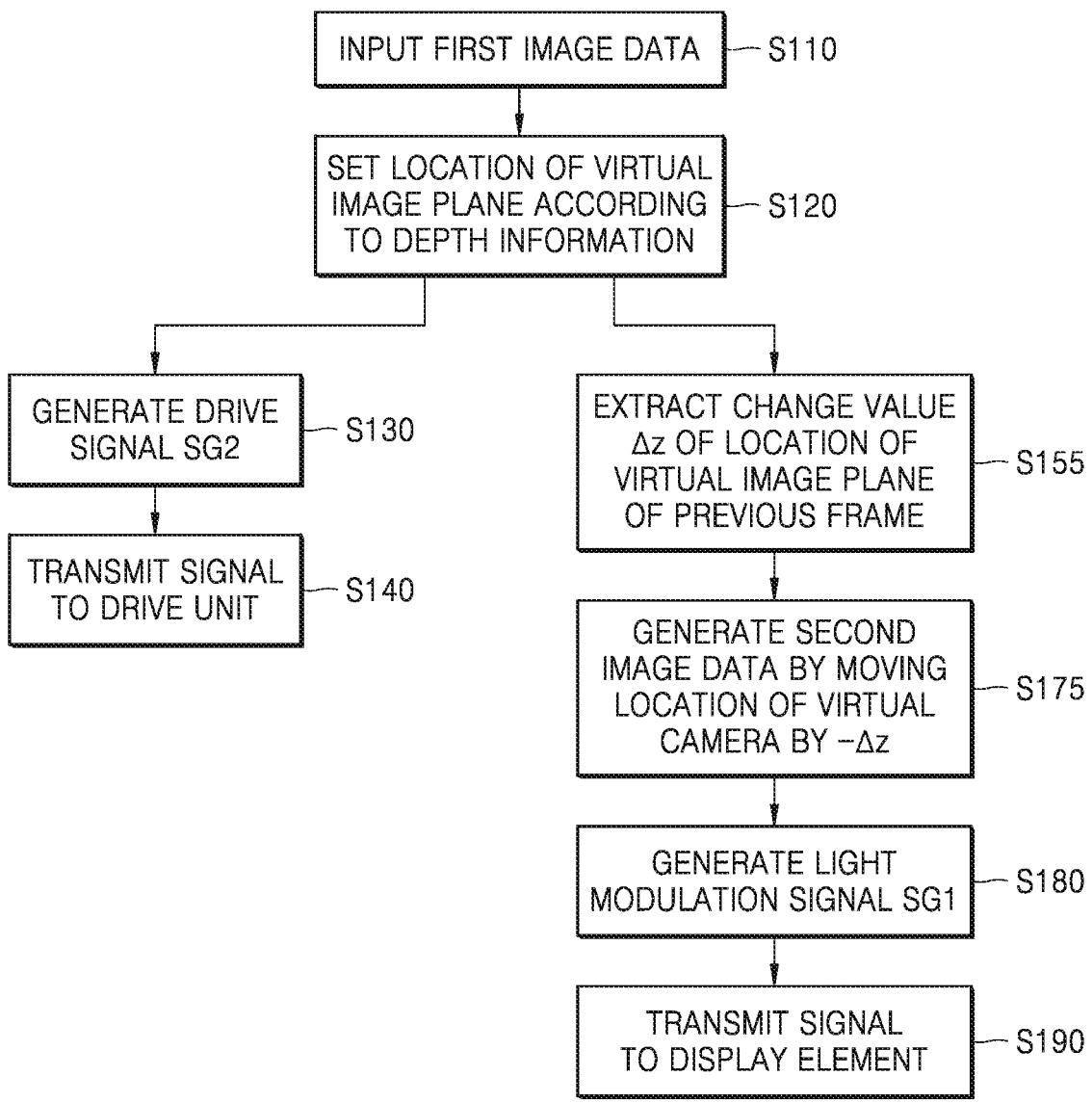
FIG. 7 is a flowchart illustrating in detail an example operation of a processor in an image display device according to an example embodiment.

FIG. 7 is a flowchart specifically illustrating an example operation of a processor in an image display device according to an example embodiment.

The image display device according to the present example embodiment is different from the image display device illustrated in FIG. 1 in a detailed method in which the processor generates the second image data obtained by correcting the first image data, and a configuration diagram thereof is substantially the same as the configuration diagram illustrated in FIG. 1.

In an operation of the processor, when the first image data is input (S110), a location of a virtual image plane is set therefrom according to depth information (S120), the drive signal SG2 is generated (S130), and the drive signal is transmitted to the drive unit (S140), which are the same as those described in FIG. 4.

A process of generating the second image data based on the depth information is different from the process described with reference to FIG. 4. In the present example embodiment, the second image data is generated by obtaining an image of the first image data from a virtual camera. At this time, a location of the virtual camera is changed according to the depth information to generate the second image data. This method may have the same effect as the method of correcting an image by using the resize function, which is described with reference to FIG. 4.

First, a change value $\Delta z$ of the location (i.e., second depth value) of the virtual image plane of the present frame (i.e., a second frame) from the location (i.e., first depth value) of the previous frame (i.e., a first frame) is extracted for the set location of the virtual image plane (S155). Next, the second image data (i.e., corrected second frame data) is generated by moving the virtual camera in a direction opposite to the change value, that is, moving the virtual camera by $-\Delta z$ to obtain an image of the first image data (S175).

Figure 8A:
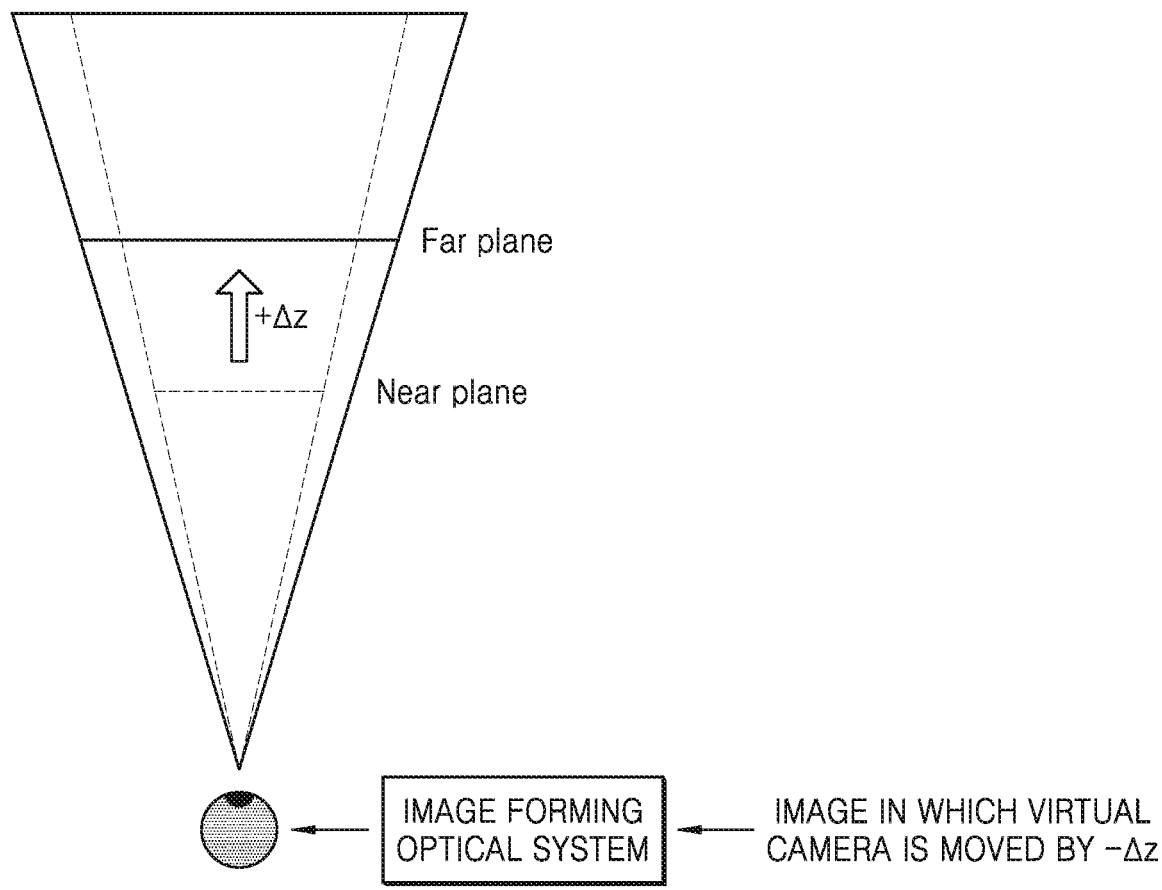
FIGS. 8A and 8B conceptually illustrate that, when an image forming optical system included in the image display device of FIG. 7 displays images at different depth locations, corrected image information is input in consideration of change directions of the depth locations.
Figure 8B:
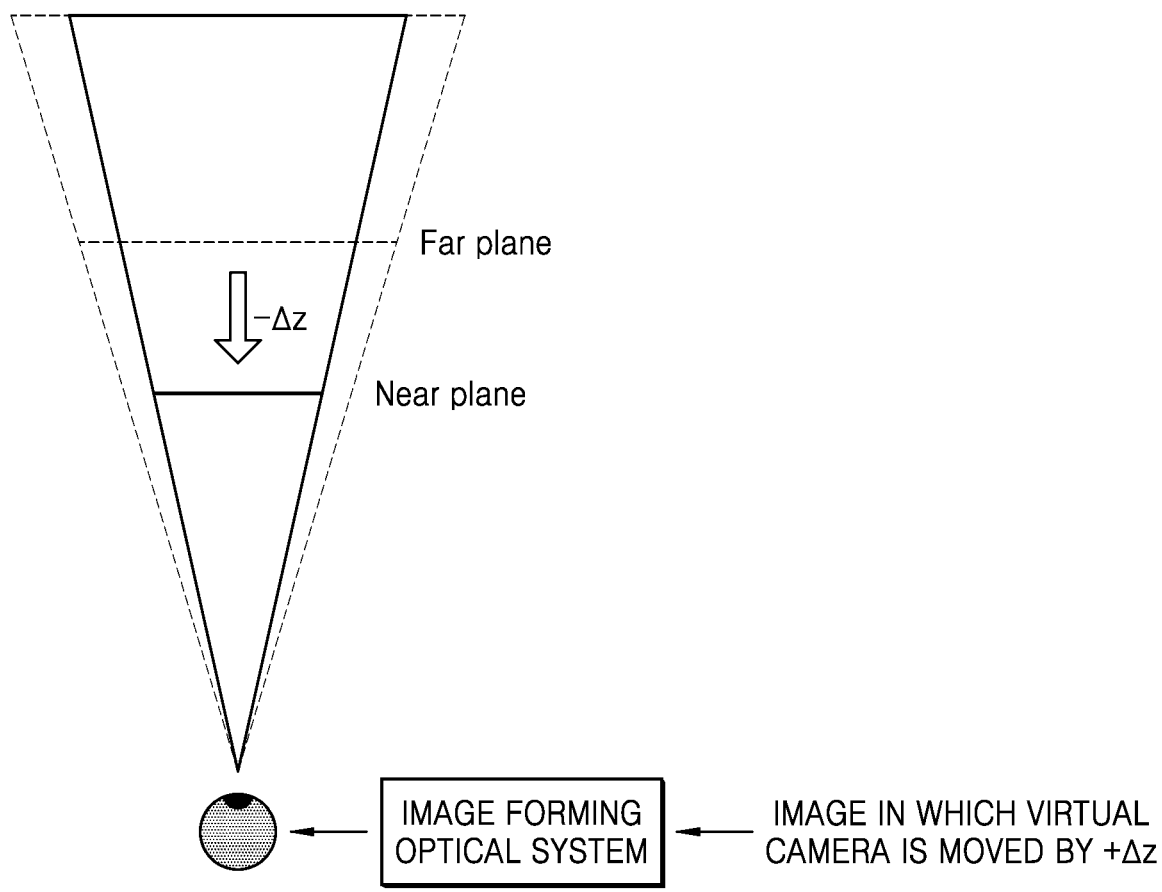

FIGS. 8A and 8B conceptually illustrate that, when an image forming optical system included in the image display device of FIG. 7 displays images at different depth locations in different frames, corrected image information is input in consideration of change directions of the depth locations from a previous frame to a present frame.

As illustrated in FIG. 8A, when the location of the virtual image plane moves away (i.e., from near to far) by $+\Delta z$, an apparent size of an image is enlarged. At this time, a size of an image input to the image forming optical system may be reduced so that an apparent image size is maintained even at the changed location of the virtual image plane. That is, the second image data obtained by correcting an image is input to the image forming optical system. The correction of the image includes moving a location of a virtual camera by $-\Delta z$ to obtain an image of the first image data from the new location of the virtual camera.

As illustrated in FIG. 8B, when the location of the virtual image plane approaches from far to near, that is, when the location of the virtual image plane is changed by $-\Delta z$, the apparent size of the image is reduced. At this time, the image input to the image forming optical system may be enlarged so that an apparent image size is maintained even at the changed location of the virtual image plane. That is, the second image data obtained by correcting an image is input to the image forming optical system. The correction of the image includes moving a location of a virtual camera by $+\Delta z$ to obtain an image of the first image data from the new location of the virtual camera.

In this way, even when the location of the virtual image plane is changed, an image having a relatively constant image size may be perceived.

Figure 9:
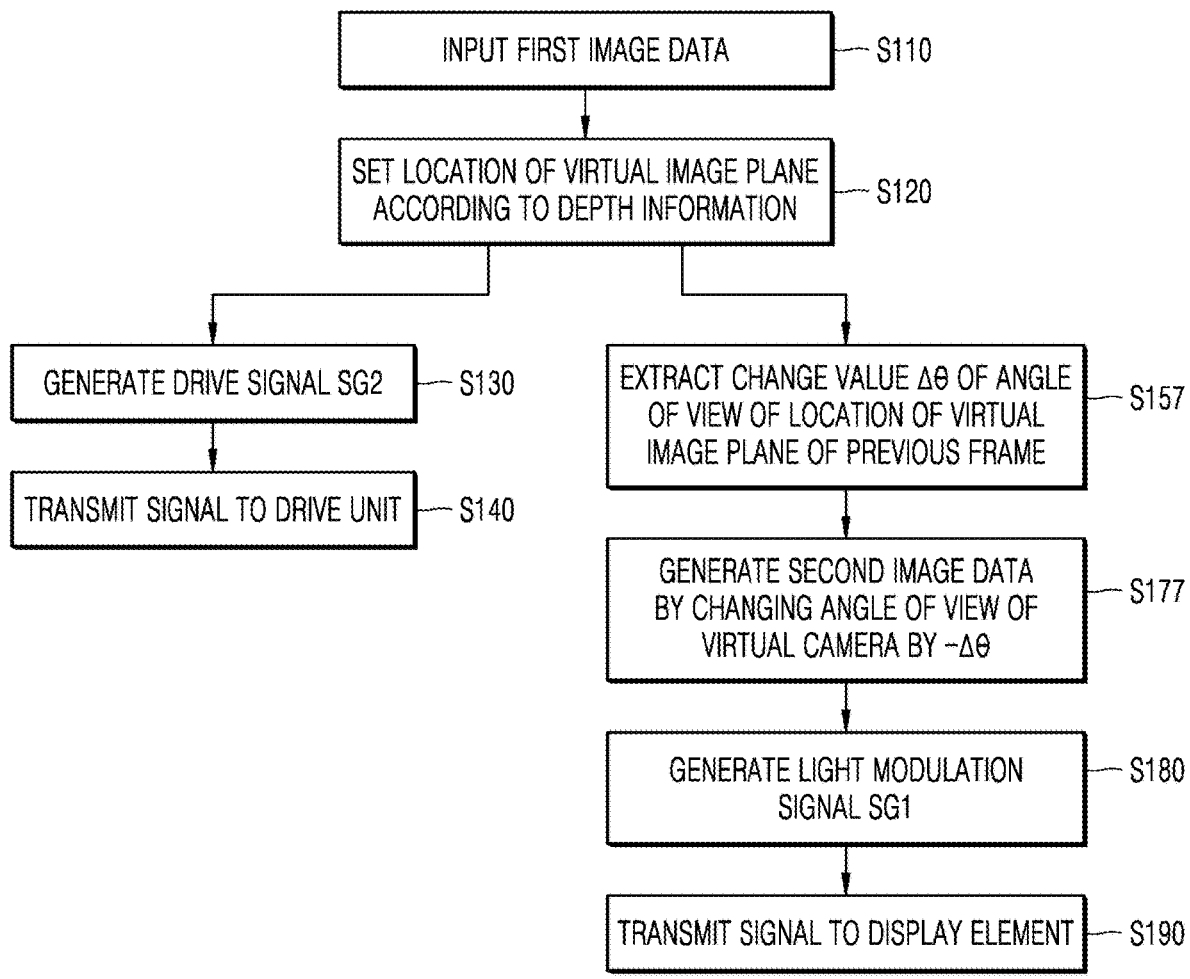
FIG. 9 is a flowchart illustrating in detail an example operation of a processor in an image display device according to an example embodiment.

FIG. 9 is a flowchart illustrating in detail an example operation of a processor in an image display device according to an example embodiment.

The image display device according to the present example embodiment is different from the image display device illustrated in FIG. 1 in a detailed method in which the processor generates the second image data obtained by correcting the first image data, and a configuration diagram thereof is substantially the same as the configuration diagram illustrated in FIG. 1.

In an operation of the processor, when the first image data is input (S110), a location of a virtual image plane is set therefrom according to depth information (S120), the drive signal (SG2) is generated (S130), and the drive signal is transmitted to the drive unit (S140). Further, the second image data is generated by obtaining an image of the first image data from the virtual camera as described with reference to FIG. 7.

In the present example embodiment, the second image data is generated by changing a field of view (FOV) of the virtual camera according to the depth information. This method may have the same effect as the method of correcting the image by using the resize function, which is described with reference to FIG. 4.

First, a change value $\Delta \theta$ of an angle of view (i.e., a field of view) of the location of the virtual image plane of the present frame from that of the previous frame is extracted for the set virtual image plane (S157). Next, the second image data is generated by changing the angle of view of the virtual camera by −Δθ to obtain an image of the first image data (S177) using the new angle of view of the virtual camera.

Figure 10A:
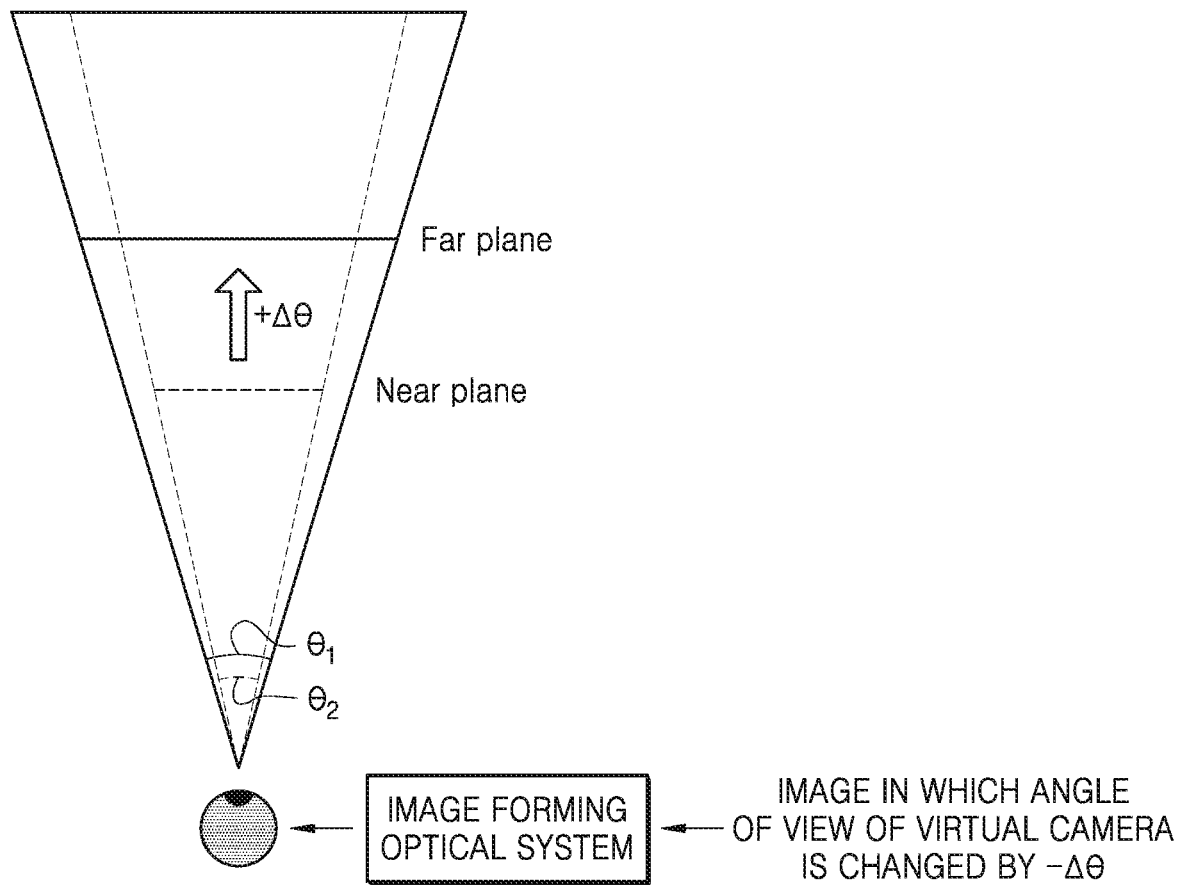
FIGS. 10A and 10B conceptually illustrate that, when an image forming optical system included in the image display device of FIG. 9 displays images at different depth locations, corrected image information is input in consideration of change directions of the depth locations.
Figure 10B:
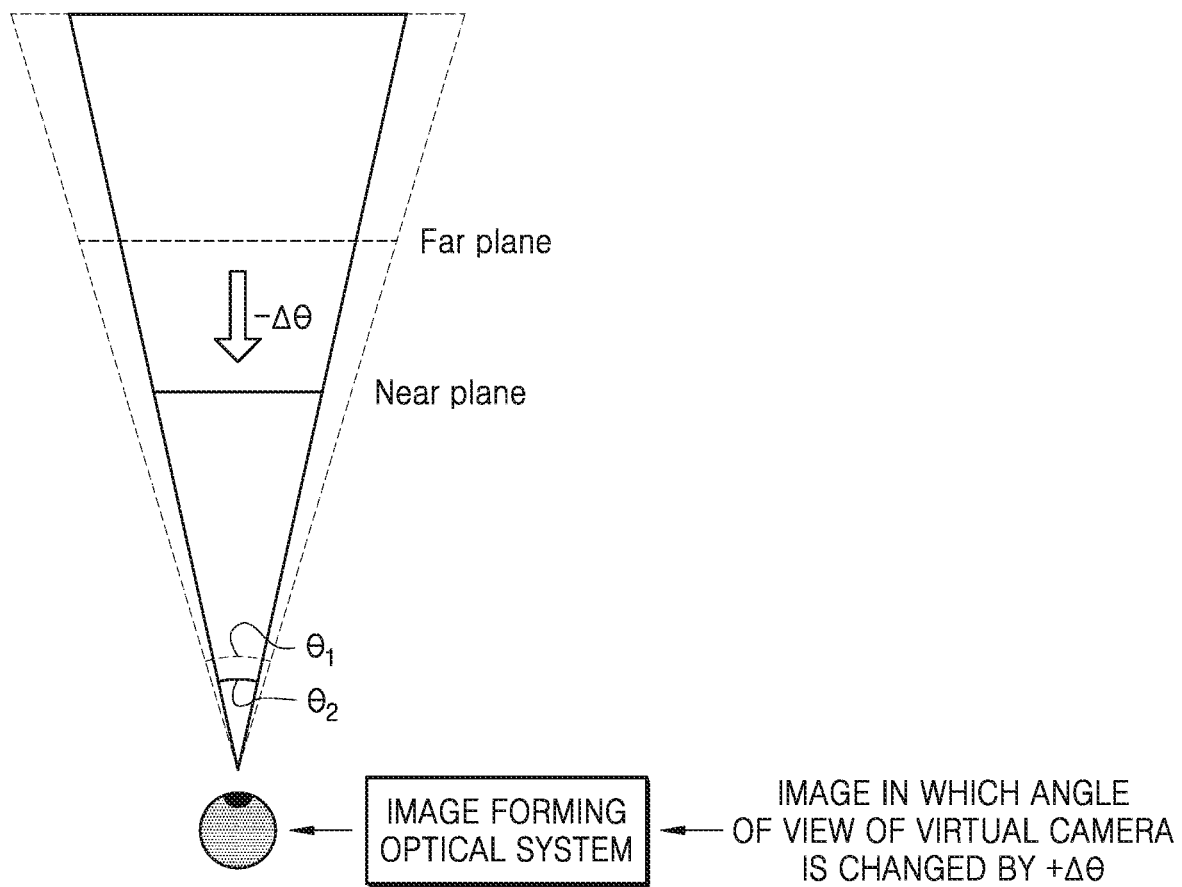

FIGS. 10A and 10B conceptually illustrate that, when an image forming optical system included in the image display device of FIG. 9 displays images at different depth locations, corrected image information is input in consideration of change directions of the depth locations.

As illustrated in FIG. 10A, when the location of the virtual image plane moves away (i.e., from near to far), the angle of view changes by Δθ and an apparent size of an image is enlarged. At this time, an image input to an image forming optical system may be reduced so that an apparent image size is maintained even at the changed location of the virtual image plane. The second image data obtained by correcting an image is input to the image forming optical system. The correction of the image includes reducing an angle of view of the virtual camera by −Δθ.

As illustrated in FIG. 10B, when the location of the virtual image plane approaches (i.e., from far to near), an angle of view changes by −Δθ and an apparent size of an image is reduced. At this time, the image input to the image forming optical system may be enlarged so that an apparent image size is maintained even at the changed location of the virtual image plane. The second image data obtained by correcting an image is input to the image forming optical system. The correction of the image includes enlarging an angle of view of the virtual camera by +Δθ.

An image having a relatively constant image size may be perceived even as the location of the virtual image plane changes from frame to frame.

Figure 11:
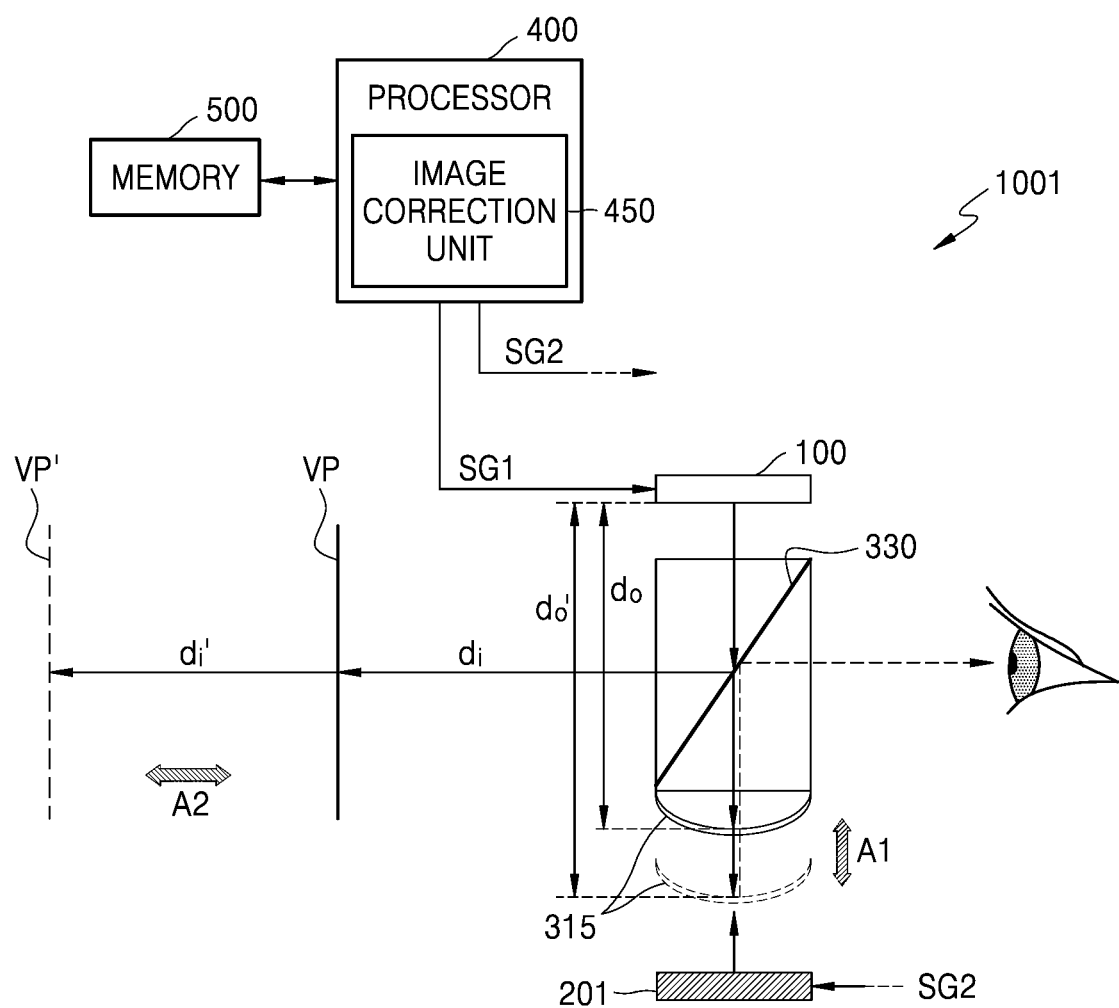
FIG. 11 illustrates a configuration and an optical arrangement of an image display device according to an example embodiment.

FIG. 11 illustrates a configuration and an optical arrangement of an image display device according to an example embodiment.

An image display device 1001 according to the present example embodiment is different from the image display device 1000 of FIG. 1 because the device and method for driving to change the location of the virtual image plane are different. The rest of the configuration is substantially the same as the configuration illustrated in FIG. 1.

Unlike the display element 100 of FIG. 1 of which a location is moved by the drive unit 200, a location of the focusing member 315 is adjusted by the drive unit 201 in the present example embodiment. When the focusing member 315 is driven by the drive unit 201 in the A1 direction, a location of the virtual image plane VP may be adjusted in the A2 direction.

In addition to this, the location of the virtual image plane formed by an image forming optical system may be adjusted in different ways. For example, a refractive power of the focusing member 315 may be controlled electrically. By changing a shape of a curved surface of the focusing member 315 or by changing a refractive index of the focusing member 315, the refractive power may be adjusted and the location of the virtual image plane may be adjusted.

Figure 12:
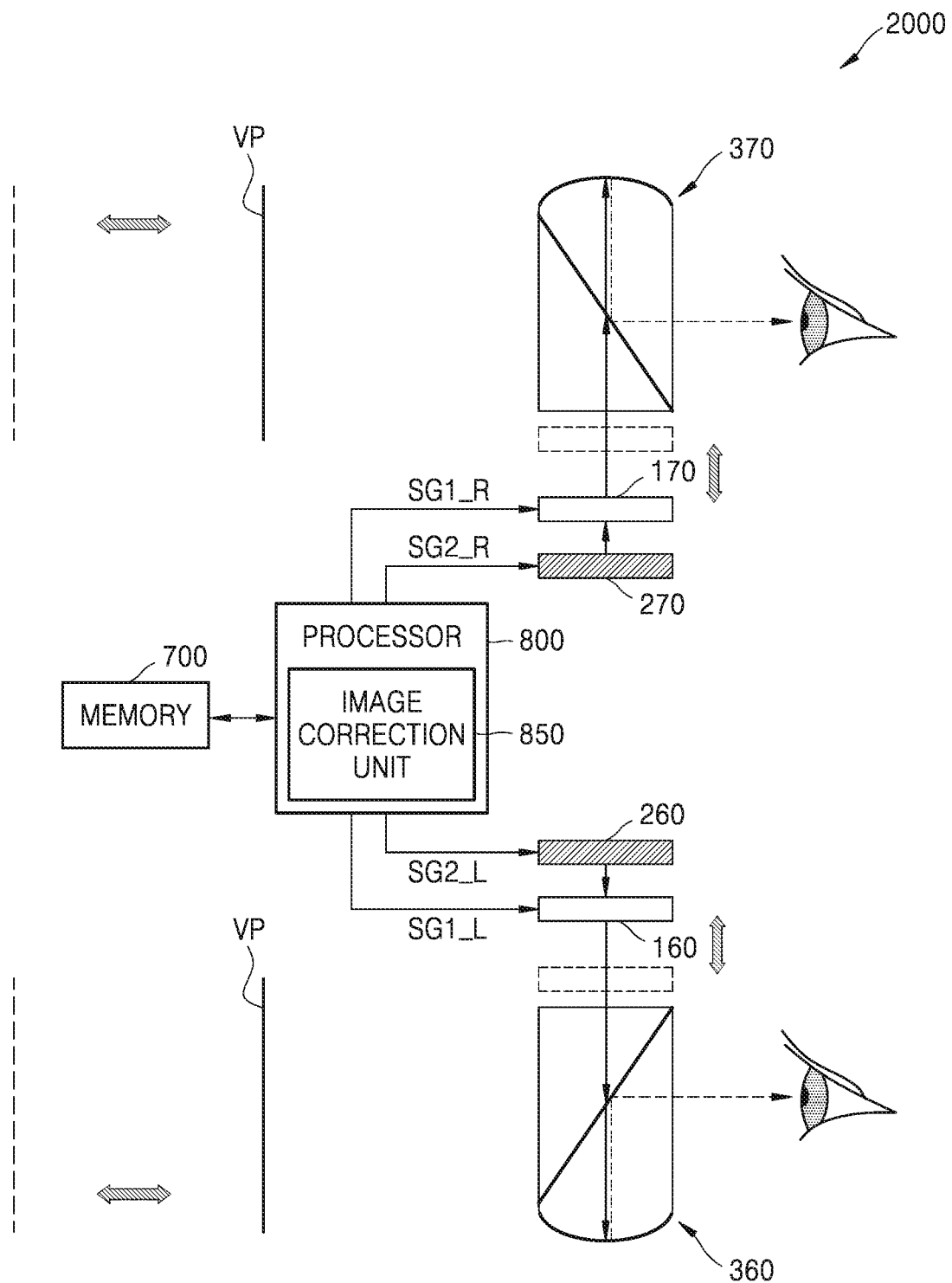
FIG. 12 illustrates a configuration and an optical arrangement of an image display device according to an example embodiment.

FIG. 12 illustrates a configuration and an optical arrangement of an image display device according to an example embodiment.

An image display device 2000 according to the present example embodiment may have a configuration in which an image is provided to both eyes. An image provided to both eyes may be the same or may have disparity information.

The image display device 2000 may include a first display element 160 (i.e., a left eye display element), a first drive unit 260, a first light transfer unit 360, a second display element 170 (i.e., a right eye display element), a second drive unit 270, and a second light transfer unit 370.

The first drive unit 260 and the second drive unit 270 drive locations of the first display element 160 and the second display element 170, respectively, and the first light transfer unit 360 and the second light transfer unit 370 transmit images (i.e., a left eye display image and a right eye display image) formed by the first display element 160 and the second display element 170 to left and right eyes of an observer, respectively, based on second left eye image data and second right eye image data, respectively, that are included in the second image data.

The image display device 2000 also includes a processor 800 and a memory 700. The processor 800 controls the first display element 160, the second display element 170, the first drive unit 260, and the second drive unit 270 according to an image stored in the memory 700 and depth information included in the image. The processor 800 also includes an image correction unit 850 that corrects image distortion according to a change in location of the virtual image plane. Program codes for operating the processor may be stored in the memory 700.

The image information stored in the memory 700 may include information on a pair of left-eye and right-eye images that may be perceived as a three-dimensional image of a frame. The left-eye image and the right-eye image have a certain disparity. The processor 800 generates light modulation signals SG1_L and SG1_R such that the left-eye image is formed by the first display element 160 and the right-eye image is formed by the second display element 170, and accordingly, the first display element 160 and the second display element 170 are controlled by the processor 800.

The image information may also further include depth information linked to the location of the virtual image plane VP where the left-eye image and the right-eye image are to be imaged, and the processor 800 may generate the drive signals SG2_L and SG2_R so that the virtual image plane VP is formed at a set depth location according to depth information, and controls the first drive unit 260 and the second drive unit 270.

The processor 800 includes an image correction unit that corrects image distortion due to a change in location of the virtual image plane. A detailed process of correcting an image by determining whether or not the location of the virtual location is changed using the image correction unit 850 is substantially the same as the process described above with reference to FIGS. 4, 7, and 9, and is different only in that the process is performed on a binocular image. A degree of correction of each of the binocular images may be the same as each other or may be different from each other.

The image display device 2000 according to the example embodiment may display a three-dimensional image by combining a binocular disparity method and depth expression.

Figure 13:
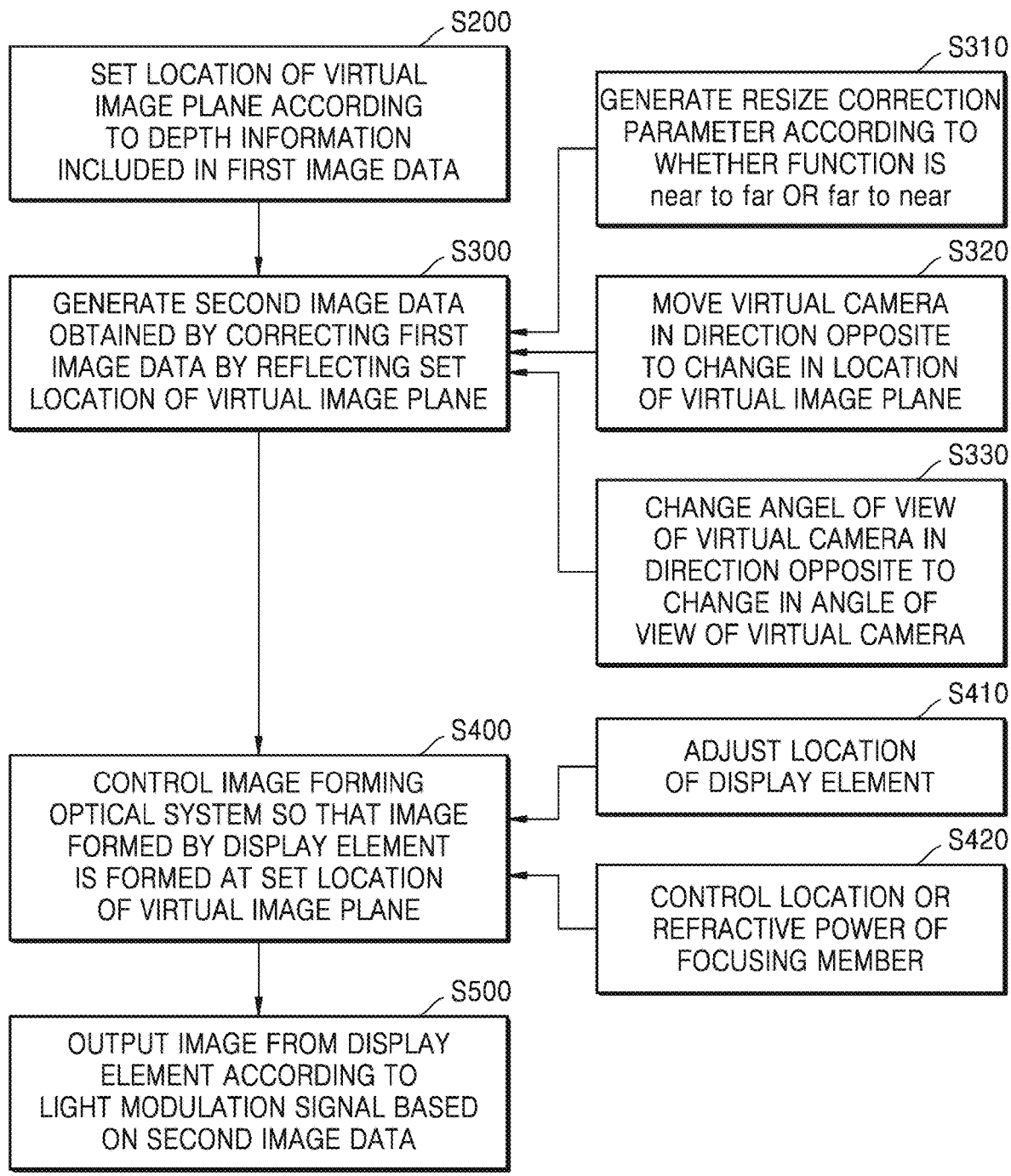
FIG. 13 is a flowchart schematically illustrating a method for image display according to an example embodiment.

FIG. 13 is a flowchart schematically illustrating a method for image display according to an example embodiment.

The method for image display may be performed by the above-described image display devices 1000, 1001, and 2000, or an image display device having a configuration modified from the image display devices.

First, a location of a virtual image plane is set according to depth information included in first image data (S200).

Next, second image data is generated by correcting the first image data based on the set location of the virtual image plane (S300).

The step of setting the location of the virtual image plane (S200) and the step of generating the second image data (S300) are performed on each of a plurality of frames, and generation of the second image data is a process of correcting the first image data so that an image of a constant apparent size is displayed at the changed location of the virtual image plane. That is, in order to generate the second image data, the location of the virtual image plane of the present frame is compared with the location of the virtual image plane of the previous frame, and then, the second image data is generated by correcting the first image data based on the comparison result.

For generating the second image data, a method of determining whether the set location of the virtual image plane is near to far or far to near relative to that of the previous frame and using a resize correction parameter associated therewith (S310), or a method of moving the virtual camera in a direction opposite to a change in location of the virtual image plane (S320), or a method of changing an angle of view of the virtual camera so that a screen size according to the change in location of the virtual image plane is offset (S330) may be used as described in FIGS. 4, 7 and 9, respectively. Although the foregoing description mainly focuses on correcting distortion according to a change in apparent size of an image, the disclosure is not limited thereto. A process of additionally correcting other image distortions, which are generated according to a change in location of the virtual image plane, for example, pincushion distortion, barrel distortion, image misalignment, and so on may be further performed.

In addition, the image forming optical system including the display element is controlled so that the image formed by the display element corresponds to the virtual image formed at the set location of the virtual image plane (S400). For adjusting the location of the virtual image plane formed by the image forming optical system, a location of the display element may be adjusted (S410) or a location or a refractive power of the focusing member may be adjusted (S420) as described above with reference to FIGS. 1 and 11, respectively.

Next, the display element outputs an image according to a light modulation signal based on the second image data (S500). The output image is a corrected image that provides an observer with a sense of depth provided to the set virtual image plane and also has little image distortion such as a change in image size according to a change in location of the virtual image plane.

The above-described method for image display may be performed by the above-described image display devices 1000, 1001, and 2000 and may be applied to modification examples thereof and a variety of optical devices and electronic devices that may utilize the image display devices.

The above-described image display devices 1000, 1001, and 2000 may be configured in a wearable form. All or a part of the configuration elements of the image display devices may be configured in a wearable form.

For example, the image display devices 1000, 1001, and 2000 may be employed in the form of a head mounted display (HMD). In addition, the disclosure is not limited thereto and may be applied to a glasses-type display or a goggle-type display.

The above-described image display devices 1000, 1001, and 2000 may be employed to implement augmented reality (AR) in that an image formed in a display element and an image of the real world may be displayed to an observer together.

The augmented reality (AR) may further increase effectiveness of a real-world image by displaying a combination of a virtual object or information and a real-world environment. For example, additional information, which is formed by an image forming unit at a location of an observer, on the real-world environment may be provided to the observer. An augmented reality (AR) display may be applied to a ubiquitous environment or an internet of things (IoT) environment.

An image of the real world is not limited to a real environment and may be, for example, an image formed by another image device. Therefore, the above-described image display device may be employed in a multi-image display device displaying two images together.

The above-described image display devices 1000, 1001, and 2000 may operate in conjunction with or in a state of being connected to other electronic devices, such as a smart phone. For example, a processor that drives the image display device 1000 or 2000 may be provided in a smart phone. In addition, the above-described image display devices 1000, 1001, or 2000 may be provided in a smartphone.

According to the above-described device and method for three-dimensional image display, different depths may be expressed for each of successive frame images while maintaining an apparent image size, and a high-quality image with less image distortion may be provided.

The above-described device for three-dimensional image display may be easily employed in a wearable device, for example, a glasses-type augmented reality display device.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:
1. An image display device comprising:
a processor configured to set a location of a virtual image plane on which a virtual image is formed according to depth information included in first image data and generate second image data obtained by correcting the first image data based on the set location of the virtual image plane;
an image forming optical system comprising:
a display panel configured to modulate light to form a display image according to the second image data; and
an optical element configured to form the virtual image on the virtual image plane, wherein the virtual image corresponds to the display image formed by the display panel, and the optical element comprises a focusing member; and
an actuator configured to drive the image forming optical system to adjust the location of the virtual image plane,
wherein the actuator is further configured to move the display panel in a direction parallel to an optical axis of the display panel so that a distance between the display panel and the optical element is changed,
wherein the first image data comprises a plurality of first frames and the second image data comprises a plurality of second frames, and
wherein the processor is further configured to set the location of the virtual image plane and generate a second frame of the plurality of second frames for each first frame of the plurality of first frames, and wherein, for a first frame from among the plurality of first frames, the processor is further configured to generate the corresponding second frame of the plurality of second frames by comparing the set location of the virtual image plane with a previous location of the virtual image plane of a previous first frame and using a correction parameter that offsets a change in magnification according to a change in the location of the virtual image plane.

2. The image display device of claim 1, wherein respective virtual images corresponding to each first frame from among the plurality of first frames have a same respective apparent size.

3. The image display device of claim 1, wherein the processor is further configured to generate a drive signal to control the image forming optical system according to the set location of the virtual image plane and transmit the drive signal to the actuator.

4. The image display device of claim 3, wherein the actuator is further configured to move the display panel in the direction parallel to the optical axis of the display panel according to the drive signal so that a distance between the display panel and the focusing member is changed.

5. The image display device of claim 4, wherein the actuator comprises a shape variable portion that is deformed according to the drive signal and provides a drive power to the display panel.

6. The image display device of claim 1, wherein the processor is further configured to generate the second image data by using a first function applied to the first image data when the location of the virtual image plane approaches an observer or a second function applied to the first image data when the location of the virtual image plane moves away from the observer.

7. The image display device of claim 6, wherein the first function and the second function are preset based on a time-stroke curve extracted from drive characteristics of the actuator.

8. The image display device of claim 1, wherein the processor is further configured to set the location of the virtual image plane by analyzing a depth map and a color map included in the first image data.

9. The image display device of claim 8, wherein the processor is further configured to set the location of the virtual image plane by using a histogram of depth values included in the depth map.

10. The image display device of claim 8, wherein the processor is further configured to set the location of the virtual image plane by analyzing saliency information based on the color map.

11. The image display device of claim 1, further comprising an eye tracking sensor configured to sense a depth location viewed by an observer, wherein the processor is further configured to set the location of the virtual image plane according to the sensed depth location.

12. The image display device of claim 1, wherein the optical element is further configured to set an image at a position of an observer by combining the display image formed by the display panel and light entering the optical element from a front side of the observer and transmits the image to a visual field of the observer.

13. The image display device of claim 1, wherein the display panel comprises a left eye display element and a right eye display element, wherein the second image data comprises second left eye image data and second right eye image data, and wherein the left eye display element is configured to form a left eye display image according to the second left eye image data and the right eye display element is configured to form a right eye display image according to the second right eye image data.

14. The image display device of claim 1, wherein the image display device is a wearable device.

15. An image display device comprising:
a processor configured to set a location of a virtual image plane on which a virtual image is formed according to depth information included in first image data and generate second image data obtained by correcting the first image data based on the set location of the virtual image plane;
an image forming optical system comprising:
a display panel configured to modulate light to form a display image according to the second image data; and
an optical element configured to form the virtual image on the virtual image plane, wherein the virtual image corresponds to the display image formed by the display panel, and the optical element comprises a focusing member; and
an actuator configured to drive the image forming optical system to adjust the location of the virtual image plane,
wherein the actuator is further configured to move the display panel in a direction parallel to an optical axis of the display panel so that a distance between the display panel and the optical element is changed,
wherein the first image data comprises a plurality of first frames and the second image data comprises a plurality of second frames,
wherein the processor is further configured to set the location of the virtual image plane and generate a second frame of the plurality of second frames for each first frame of the plurality of first frames, and
wherein the processor is further configured to generate the second image data by:
obtaining an image of the first image data captured by a virtual camera positioned at a first position; and
for a first frame from among the plurality of first frames, moving the virtual camera by a distance $-\Delta z$ to a second position, where $\Delta z$ represents a change value obtained by comparing the set location of the virtual image plane with a previous location of the virtual image plane of a previous first frame.

16. An image display device comprising:
a processor configured to set a location of a virtual image plane on which a virtual image is formed according to depth information included in first image data and generate second image data obtained by correcting the first image data based on the set location of the virtual image plane;
an image forming optical system comprising:
a display panel configured to modulate light to form a display image according to the second image data; and
an optical element configured to form the virtual image on the virtual image plane, wherein the virtual image corresponds to the display image formed by the display panel, and the optical element comprises a focusing member; and
an actuator configured to drive the image forming optical system to adjust the location of the virtual image plane, wherein the actuator is further configured to move the display panel in a direction parallel to an optical axis of the display panel so that a distance between the display panel and the optical element is changed, wherein the first image data comprises a plurality of first frames and the second image data comprises a plurality of second frames, wherein the processor is further configured to set the location of the virtual image plane and generate a second frame of the plurality of second frames for each first frame of the plurality of first frames, and wherein the processor is further configured to generate the second image data by:
  obtaining an image of the first image data captured by a virtual camera having a first field of view; and
  for a first frame from among the plurality of first frames, changing the first field of view of the virtual camera by $-\Delta\theta$ to a second field of view, where $\Delta\theta$ represents a change value obtained by comparing a field of view corresponding to the set location of the virtual image plane with a previous field of view corresponding to the virtual image plane of a previous first frame.

17. An image display method comprising:

setting a location of a virtual image plane on which a virtual image is formed according to depth information included in first image data;

generating second image data obtained by correcting the first image data based on the set location of the virtual image plane;

controlling an image forming optical system including a display panel so that the virtual image is formed at the set location of the virtual image plane, wherein the virtual image corresponds to a display image formed by the display panel; and transmitting, using an optical element, a light modulation signal based on the second image data to the display panel, wherein the controlling the image forming optical system comprises moving the display panel in a direction parallel to an optical axis of the display panel so that a distance between the display panel and the optical element is changed, wherein the first image data comprises a plurality of first frames and the second image data comprises a plurality of second frames, wherein the setting the location of the virtual image plane is performed for each first frame from among the plurality of first frames, wherein the generating of the second image data comprises generating a second frame of the plurality of second frames for each first frame of the plurality of first frames, and wherein, for a first frame from among the plurality of first frames, the generating the second image data comprises:
  comparing the set location of the virtual image plane with a previous location of the virtual image plane of a previous first frame; and
  using a correction parameter that offsets a magnification change according to a change in the location of the virtual image plane.

18. The image display method of claim 17, wherein respective virtual images corresponding to each first frame from among the plurality of first frames have a same respective apparent size.

19. The image display method of claim 17, wherein the using the correction parameter comprises extracting the correction parameter from a time-stroke curve preset based on drive characteristics of an actuator for driving the display panel.

20. An image display method comprising:

setting a location of a virtual image plane on which a virtual image is formed according to depth information included in first image data;

generating second image data obtained by correcting the first image data based on the set location of the virtual image plane;

controlling an image forming optical system including a display panel so that the virtual image is formed at the set location of the virtual image plane, wherein the virtual image corresponds to a display image formed by the display panel; and transmitting, using an optical element, a light modulation signal based on the second image data to the display panel, wherein the controlling the image forming optical system comprises moving the display panel in a direction parallel to an optical axis of the display panel so that a distance between the display panel and the optical element is changed, wherein the first image data comprises a plurality of first frames and the second image data comprises a plurality of second frames, wherein the setting the location of the virtual image plane is performed for each first frame from among the plurality of first frames, wherein the generating of the second image data comprises generating a second frame of the plurality of second frames for each first frame of the plurality of first frames, and wherein the generating the second image data comprises:
  obtaining an image of the first image data captured by a virtual camera positioned at a first position; and
  for a first frame from among the plurality of first frames, moving the virtual camera by a distance $-\Delta z$ to a second position, where $\Delta z$ represents a change value obtained by comparing the set location of the virtual image plane with a previous location of the virtual image plane of a previous first frame.

21. An image display method comprising:

setting a location of a virtual image plane on which a virtual image is formed according to depth information included in first image data;

generating second image data obtained by correcting the first image data based on the set location of the virtual image plane;

controlling an image forming optical system including a display panel so that the virtual image is formed at the set location of the virtual image plane, wherein the virtual image corresponds to a display image formed by the display panel; and transmitting, using an optical element, a light modulation signal based on the second image data to the display panel, wherein the controlling the image forming optical system comprises moving the display panel in a direction parallel to an optical axis of the display panel so that a distance between the display panel and the optical element is changed, wherein the first image data comprises a plurality of first frames and the second image data comprises a plurality of second frames, wherein the setting the location of the virtual image plane is performed for each first frame from among the plurality of first frames, wherein the generating of the second image data comprises generating a second frame of the plurality of second frames for each first frame of the plurality of first frames, and wherein the generating the second image data comprises:
  obtaining an image of the first image data captured by a virtual camera having a first field of view; and
  for a first frame from among the plurality of first frames, changing the first field of view of the virtual camera by $-\Delta\theta$ to a second field of view, where $\Delta\theta$ represents a change value obtained by comparing a field of view corresponding to the set location of the virtual image plane with a previous field of view corresponding to the virtual image plane of a previous first frame.

\* \* \* \* \*